United States Statutory Invention Registration [19]

[11] Reg. Number: H370

Gold

[43] Published: Nov. 3, 1987

[54] MICROWAVE CIRCULAR POLARIZATION ANALYZER

[75] Inventor: Steven H. Gold, New Carrollton, Md.

[73] Assignee: United States of America, Washington, D.C.

[21] Appl. No.: 937,801

[22] Filed: Dec. 1, 1986

[51] Int. Cl.[4] ..... H01P 5/12; H01P 1/16

[52] U.S. Cl. ..... 333/113; 333/21 A

[56] References Cited

PUBLICATIONS

Gold, Steven H. "Ka-band Circular Polarization Analyzer," *Rev. Sci. Instrum.*, 57(1), Jan. '86.

*Primary Examiner*—Stephen C. Buczinski
*Assistant Examiner*—Linda J. Wallace
*Attorney, Agent, or Firm*—Sol Sheinbein; Andrew M. Lesniak

[57] ABSTRACT

A microwave circular polarizer having two matched waveguide arms with a first arm having a twist in a first rotational sense and with a second arm having a twist in a second (reverse) rotational sense, and a hybrid coupler receiving radiation signals from the two arms. A left-hand 45° twist in one arm and a right-hand 45° twist in the other arm ensure that orthogonal linearly polarized components of an incident radiation field are combined in the hybrid coupler so as to direct a right circularly polarized signal out of one of the remaining ports of the hybrid coupler, and to direct a left circularly polarized signal from the other remaining port of the hybrid coupler.

6 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

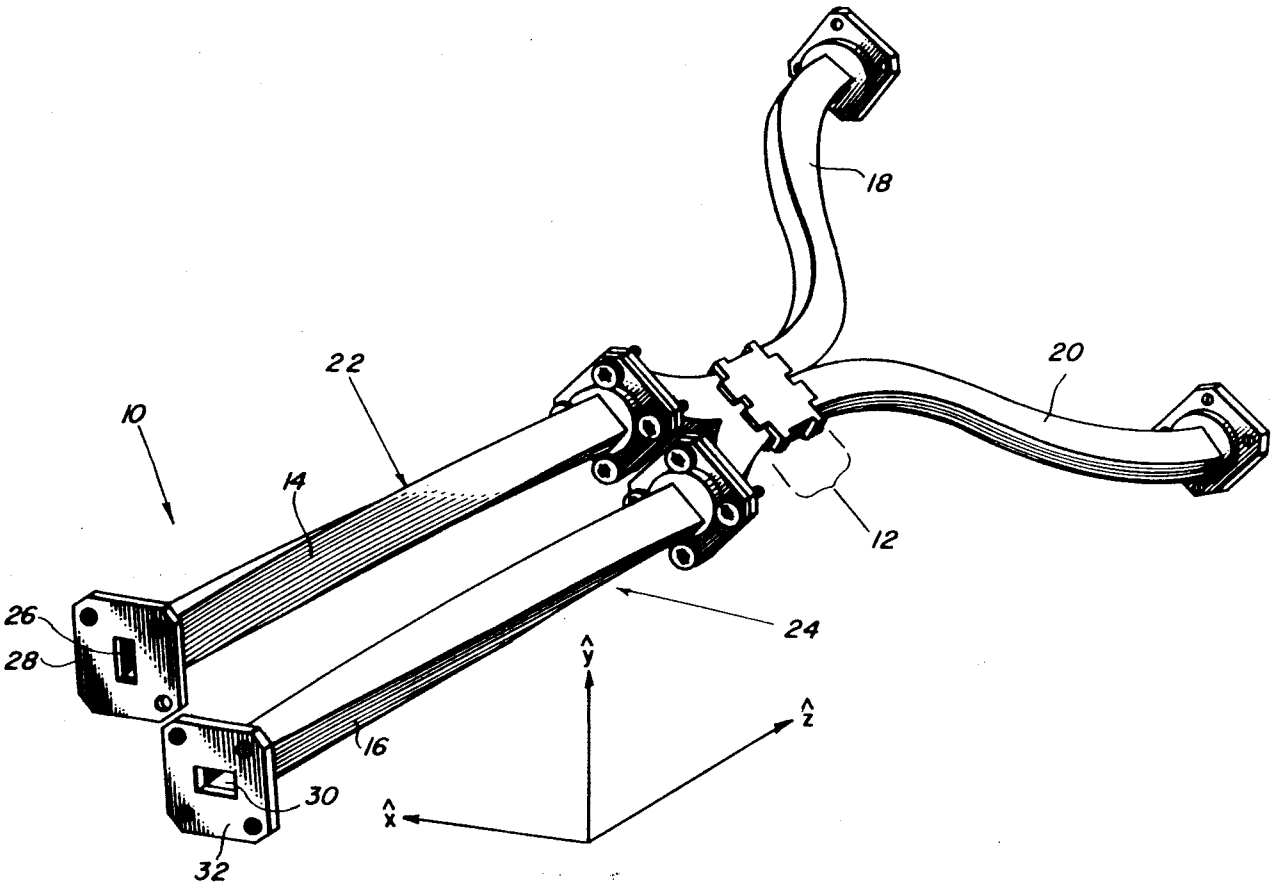
10
12
14
16
18
20
22
24
26
28
30
32
$\hat{x}$
$\hat{y}$
$\hat{z}$

MICROWAVE CIRCULAR POLARIZATION ANALYZER

BACKGROUND OF THE INVENTION

This invention relates to a microwave circular polarization analyzer and more particularly to one that samples orthogonal linearly polarized components of an incident radiation field.

Theory suggests that the emission from certain classes of microwave devices should be in a single circularly polarized state. Study of emission from a high-gain 35-GHz free-electron laser (FEL) amplifier utilizing a right handscrew helical wiggler magnetic field and operating in the fundamental $TE_{11}°$ mode gave rise to the desire to test a theoretical prediction that the emission should be left circularly polarized. Various devices that might be used to perform this test were considered. Each such device had drawbacks in terms of cost and complexity, and required specialized fabrication as well as careful adjustment and calibration.

The literature lists a variety of circular-polarization diplexers that could seemingly permit this determination. In a circular-polarization diplexer, a microwave signal entering one (circular) port is divided between two output ports depending on the fraction of the signal in each circular polarization. One possible configuration is the use of a quasi-optical quarter-wave plate or a waveguide quarter-wave section (e.g. a section of elliptical waveguide) to convert circular to linear polarization, followed by a linear polarization analyzer, such as a fin-line polarization analyzer. Another alternative is a complex waveguide device called a turnstile junction, with four rectangular ports, a circular port, and several coaxial matching pins. By shorting two of the rectangular arms at precise fractions of a wavelength from the circular port, this junction will act as a circular polarization analyzer without requiring a quarter-wave section, and the right and left circularly polarized components of the signal in the circular arm will separate into the remaining two rectangular arms. Each of these approaches has drawbacks in terms of cost and complexity, requiring specialized fabrication as well as careful adjustment and calibration.

If the condition of a single input port is relaxed to allow two separate matched input ports, to be positioned to sample a uniform portion of a radiation field, such as the center of the antenna pattern of a microwave horn driven by a $TE_{1n}°$ mode, simpler circular polarization analyzers are possible. One might use a circularly polarized helical beam antenna with a rectangular feed; a matched pair of such antennas, one left and one right circularly polarized would serve this function. As an alternative, a simple circular-polarization analyzer can be constructed whose principal components are a hybrid coupler, which is readily available commercially, and two 45° waveguide twists, which are easily fabricated from straight waveguide. This device will operate without special adjustment and calibration over the bandwidth of the hybrid coupler (typically at least 10%).

OBJECTS OF THE INVENTION

An object of the invention is to provide a microwave circular polarization analyzer.

Yet another object of the invention is to provide a microwave circular polarization analyzer that will operate without special adjustment and calibration over a specific bandwidth.

Still another object of the invention is to provide a microwave circular polarization analyzer that will function in a uniform radiation field.

Still another object of the invention is to provide a microwave circular polarization analyzer in the form of a symmetric device.

This invention provides a microwave circular polarization analyzer comprised of a waveguide hybrid coupler, a first waveguide arm having a left-hand 45° waveguide twist coupled to the hybrid coupler, and a second waveguide arm having a right-hand 45° waveguide twist coupled to the hybrid coupler.

BRIEF DESCRIPTION OF THE DRAWING

The FIGURE is a perspective view of a $K_a$-band circular polarization analyzer constructed in accordance with the invention.

DESCRIPTION OF THE PREFERRED EMBODIMENT

Referring now to the FIGURE, device 10 comprises a short-slot hybrid 3-db coupler 12 and two symmetrically arranged waveguide arms 14 and 16 for channeling radiation signals to the hybrid coupler 12. Two waveguide arms 18 and 20 coupled to coupler 12 serve to channel radiation signals from the coupler. Arm 14 and arm 16 are matched in length as well as symmetrically arranged relative to coupler 12. Arm 18 and arm 20 likewise are symmetrically arranged relative to the coupler 12.

A left-hand 45° waveguide twist 22 formed in arm 14 and a right-hand 45° waveguide twist 24 formed in arm 16 preserve uniform signal phase of signals carried to the coupler 12 and also enable the device 10 to sample orthogonal linearly polarized components of a test radiation field. A "Magic Tee" coupler could be used in lieu of the coupler 12 in which case the arms 14 and 16 would include elbows to preserve device symmetry while pointing the arms 14 and 16 in the same direction toward an incident radiation field.

A vertical slot 26 formed in a flanged front end 28 of arm 14 and a horizontal slot 30 formed in a flanged front end 32 of arm 16 each admit one of two orthogonal linearly polarized components of an incident radiation field. These slots 26 amd 30 are connected via carefully matched equal lengths of the waveguide arms 14 and 16 to respective input ports of the coupler 12. The arms 14 and 16 and coupler 12 are sized to handle $K_a$-band radiation (26–40 Giga-hertz); WR-28 waveguide members, of specified cross-sectional dimensions, are used together with a WR-28 size waveguide coupler. In accordance with the invention, each of the waveguide arms 14 and 16 incorporates a 45° twist, and the twist in arm 14 must have opposite sense of rotation relative to the sense of rotation of the twist in arm 16.

Hybrid coupler 12 is a conventional symmetric four-port device, including two input ports and two output ports, that has the property that a signal inserted into arm 14 splits equally into arms 18 and 20, but the signal in arm 20 lags the signal in arm 18 by 90° phase. Any other choice of input arm has a result symmetric to this, so that a signal inserted into arm 16 also splits equally into arms 18 and 20, but the signal in arm 18 lags the signal in arm 20 by 90° in phase. The combination of the two 45° twists 22 and 24 of opposite sense and the hybrid coupler 12 produces a symmetric device 10 that functions as a circular-polarization analyzer in a uniform radiation field.

In order to understand the behavior of the device 10, assume an incident microwave radiation field propagating in the +z direction, $$E(x,y,z,t)=\hat{x}E_x \cos(kz-\omega t+\phi)+\hat{y}E_y \cos(kz-\omega t).$$

The coordinate system is defined in the FIGURE. Neglecting equal coupling losses into arms 14 and 16, the signal entering arm 14 is just $E_x \cos(kz-\omega t+\phi)$ and the signal entering arm 16 is just $E_y \cos(kz-\omega t)$. Then, neglecting waveguide losses and phase shifts in the device (other than the relative phase shifts induced by the hybrid coupler), which should be approximately equal for each signal, the electric field magnitudes at arm 18 and 20 are given by $$E_{18}=(\tfrac{1}{2})[-E_x \cos(kz-\omega t+\phi)+E_y \cos(kz-\omega t+\pi/2)]$$

and $$E_{20}=(\tfrac{1}{2})[-E_x \cos(kz-\omega t+\phi+\pi/2)E_y \cos(kz=\omega t)].$$

The relative minus sign in each of these equations results from the combination of a left-hand 45° twist in arm 14 and a right-hand 45° twist in arm 16 (Interchanging the twists would have introduced a relative plus sign into each of these equations.)

For the case of a circularly polarized radiation field, $E_x=E_y$ and $\phi=\pm\pi/2$. For left circular polarization, $\phi=-\pi/2$, and $$E_{18}=E_x \sin(kz-\omega t),$$

$$E_{20}=0.$$

Similarly, for right circular polarization, $\phi=\pi/2$, and $$E_{18}=0.$$

$$E_{20}=E_x \cos(kz-\omega t).$$

For linear polarization, the relative magnitudes of $E_x$ and $E_y$ are arbitrary, but $\phi=0$. The measured power in each arm is proportional to the integral of the square of the rf electric field over an rf period, i.e., $$\int_0^{2\pi/\omega} E^2 dt.$$

In this case, it is easy to see that for $\phi=0$ the cross terms in both $E_{18}^2$ and $E_{20}^2$ vanish when integrated over an rf period, and that the time averaged power in each arm is proportional to the sum of $E_x^2+E_y^2$.

Thus, the specific configuration depicted in the FIGURE, in which the left upper pickup arm 14 is horizontally polarized, followed by a left-hand 45° twist, and the right lower pickup arm 16 is vertically polarized, followed by a right-hand 45° twist, left circularly polarized signals will be transmitted to the upper output arm 18 and right circularly polarized signals will be transmitted to the lower output arm 20. A linearly polarized signal with an arbitrary orientation, or an unpolarized signal, will split equally between arms 18 and 20. Rotating the device around the z axis will in no way affect its operation.

The simplicity of this device is such that careful adjustment and calibration, which requires a cold-test source of radiated circular polarization, should not be required unless a very high degree of isolation between the left and right circularly polarized channels is necessary. If (1) the signals into each input arm 14, 16 of the hybrid coupler 12 are equal in amplitude, (2) the polarization of the pickup antennas are orthogonal, and (3) the lengths of arms 14 and 16 are equal, the device will work as intended in an incident circularly polarized radiation field. With normal care in fabrication, each of these conditions is easy to ensure.

The first condition requires that the receiving horns are well matched, which is straightforward when each is just the open end of a piece of in-band waveguide, so that the signals in each arm will initially be equal, and that the waveguide joints are properly fabricated, so that the signal amplitudes in each arm 14, 16 remain equal, which can be verified by measuring the coupling from arms 14 and 16 to arms 18 and 20. The device is in fact insensitive to a small error in the relative signal amplitudes of the two input arms. For instance, for $\phi=-\pi/2$ (left circular polarization), with a signal imbalance of R′ (in dB) between the input arms 18, 20, the power ratio (R) between the output arms 18 and 20 would be $$R(dB)=20 \log[(10^{R'/20}+1)/(10^{R'/20}-1)].$$

As an example, a relative error of 1 dB in the input of the device would yield an isolation ratio of 24.8 dB at the output. An improbably large error of 3 dB (i.e., a factor of two power ratio between input arms 14 and 16) would still yield a separation of greater than 15 dB between the two output arms.

The second condition can be determined to sufficient accuracy by using a square to establish a precise 90° angle between adjoining edges of flanges 28 and 32. The necessary precision for this step is in fact quite low. If the angle between the polarization vectors of arms 14 and 6 is $90°+\delta$, it is straightforward to show that for circularly polarized incident radiation, the power ratio between the two output arms due to this angular error is $$R(dB)=10 \log[(1+\cos\delta)/(1-\cos\delta)].$$

Thus, an error of 1° would produce an isolation ratio exceeding 40 dB, an error of 3° would result in an isolation of greater than 30 dB, and an improbably large error of 10° would still provide a separation of 21.2 dB at the output of the analyzer.

The third condition can be determined to a small fraction of a wavelength with calipers. The use of matched left and right-hand 45° twists in either arm 14, 16, rather than a single 90° twist in one arm, ensures that there is no uncompensated phase error introduced between the two arms. The effect of a small error in the relative lengths of arms 14 and 16 is minimized because the phase error $\Delta\phi$ due to a length difference $\Delta x$ is due only to the difference in phase velocity of the wave in free space ($\nu_{ph}=c$, the speed of light) compared to the phase velocity in waveguide $[\nu_{ph}=c[1-\omega_{co}^2)^{-\frac{1}{2}}]$ over the distance $\Delta x$. Here $\omega$ is the angular frequency of the microwave radiation, and $\omega_{co}/2\pi$ is the cutoff frequency of the waveguide. The resultant phase error is $$\Delta\phi = (\omega\Delta x/c)[1-(1-\omega_{co}^2/\omega^2)^{\frac{1}{2}}]$$

For example, operating at 35 GHz in WR-28 waveguide ($\omega_{co}/2\pi = 21.1$ *GHz*), the factor in brackets is $\sim 0.2$, so that the phase error is reduced by approximately a factor of five. It is easy to show that for a circularly polarized signal, the power ratio between the two output arms due to a phase error $\Delta\phi$, takes a form identical to that for an angular error $\delta$ in the flange orientation, i.e., $$R(dB) = 10 \log \{[1+\cos(\Delta\phi)]/[1-\cos(\Delta\phi)]\}.$$

Thus, an error $\Delta x$ of 0.5 mm would yield an isolation ratio of 28.5 dB between the output arms 18 and 20.

The one parameter to which the device can be highly sensitive is the magnitude of signal reflection in the output (18, 20) and input (14, 16) arms; a reflected signal in one output arm, subsequently reflecting equally from the ends of the open input arms 14 and 16, would couple directly to the other output arm. This indicates that careful assembly of the output arms 18, 20 is required, so as to minimize unwanted reflections.

In summary, a device 10 has been constructed to measure the state of circular polarization of a microwave radiation field.

The most desirable features of the device 10 are low cost and ease of fabrication. As demonstrated, the separation between the output arms exceeded 30 dB without requiring special adjustment in a known circularly polarized radiation field to "trim out" the error signal in the cross-polarized arm. (Still higher separation should be possible, if a circularly polarized reference source is available, by adjusting the amplitude and phase in the input arms to minimize the error signal.) Through proper choice of in-band waveguide components, similar devices could easily be assembled over a broad range of desired operating frequencies, ranging from centimeter through millimeter waves. Such devices may have application in a variety of situations requiring the diagnosis of circularly polarized microwave radiation.

Obviously many modifications and variations of the invention are possible in light of the above teachings. It is therefore to be understood that within the scope of the appended claims the invention may be practiced otherwise than as specifically described.

I claim:

1. A circular polarization analyzer, comprising:

a waveguide hybrid coupler, a first waveguide arm coupled to the hybrid coupler to introduce a first signal into the hybrid coupler, a twist in the first arm rotating in a first direction over a 45° angle;

a second waveguide arm coupled to the hybrid coupler to introduce a second signal into the hybrid coupler, a twist in the second arm rotating in a second direction over a 45° angle;

said arms being matched in length and symmetrically arranged relative to said hybrid coupler;

whereby said first and second arms sample orthogonal linearly polarized components of an incident radiation field and combine them in said hybrid coupler to test the circular polarization of microwave radiation.

2. The analyzer set forth in claim 1 wherein said hybrid coupler has first and second input ports and first and second output ports, said first arm being coupled to said first input port, and said second arm being coupled to said second input port.

3. The analyzer set forth in claim 2 wherein said hybrid coupler is a short-slot 3-db coupler that can split a radiation signal into two parts of equal strength.

4. The analyzer set forth in claim 1 wherein said hybrid coupler and said arms are sized in cross-section to form a $K_a$-band device.

5. The analyzer set forth in claim 4 wherein said arms are comprised of WR-28 waveguide sections.

6. The analyzer set forth in claim 1 wherein said hybrid coupler is a symmetric four port device characterized in that a radiation signal channeled through the first arm to the coupler splits into two parts in the coupler producing two output signals from said hybrid coupler separated by a phase angle of 90°.

* * * * *